(12) United States Patent
Al-Wahabi

(10) Patent No.: US 9,348,710 B2
(45) Date of Patent: May 24, 2016

(54) PROACTIVE FAILURE RECOVERY MODEL FOR DISTRIBUTED COMPUTING USING A CHECKPOINT FREQUENCY DETERMINED BY A MTBF THRESHOLD

(71) Applicant: Saudi Arabian Oil Company, Dhahran (SA)

(72) Inventor: Khalid S. Al-Wahabi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 36 days.

(21) Appl. No.: 14/445,369

(22) Filed: Jul. 29, 2014

(65) Prior Publication Data

US 2016/0034362 A1    Feb. 4, 2016

(51) Int. Cl.
| | | |
|---|---|---|
| G06F 11/00 | (2006.01) | |
| G06F 11/20 | (2006.01) | |
| G06F 11/07 | (2006.01) | |
| G06F 11/14 | (2006.01) | |
| G06F 11/34 | (2006.01) | |

(52) U.S. Cl.
CPC .......... *G06F 11/203* (2013.01); *G06F 11/0721* (2013.01); *G06F 11/0757* (2013.01); *G06F 11/1407* (2013.01); *G06F 11/1438* (2013.01); *G06F 11/1461* (2013.01); *G06F 11/1471* (2013.01); *G06F 11/34* (2013.01)

(58) Field of Classification Search
None
See application file for complete search history.

(56) References Cited

U.S. PATENT DOCUMENTS

| | | | |
|---|---|---|---|
| 6,032,194 A | 2/2000 | Gai et al. | |
| 6,161,219 A * | 12/2000 | Ramkumar | ......... G06F 11/1438 714/E11.209 |
| 6,353,902 B1 | 3/2002 | Kulatunge et al. | |
| 6,978,398 B2 | 12/2005 | Harper et al. | |
| 7,269,706 B2 * | 9/2007 | Agarwal | .............. G06F 11/1451 711/173 |
| 7,272,755 B2 | 9/2007 | Smith | |
| 7,539,752 B1 | 5/2009 | Chakravarti et al. | |
| 7,600,160 B1 | 10/2009 | Lovy et al. | |
| 7,721,157 B2 | 5/2010 | Spitz et al. | |
| 7,730,364 B2 * | 6/2010 | Chang | ................... G06F 11/008 714/47.2 |
| 8,103,916 B2 * | 1/2012 | Klein | .................. G06F 11/0751 702/123 |

(Continued)

FOREIGN PATENT DOCUMENTS

WO    WO2011080910    7/2011

OTHER PUBLICATIONS

PCT International Search Report and Written Opinion of the International Searching Authority, PCT/US2015/041121, Nov. 10, 2015, 13 pages.

*Primary Examiner* — Gabriel Chu
(74) *Attorney, Agent, or Firm* — Fish & Richardson P.C.

(57) ABSTRACT

This disclosure generally describes methods and systems, including computer-implemented methods, computer-program products, and computer systems, for providing a proactive failure recovery model for distributed computing. One computer-implemented method includes building a virtual tree-like computing structure of a plurality of computing nodes, for each computing node of the virtual tree-like computing structure, performing, by a hardware processor, a node failure prediction model to calculate a mean time between failure (MTBF) associated with the computing node, determining whether to perform a checkpoint of the computing node based on a comparison between the calculated MTBF and a maximum and minimum threshold, migrating a process from the computing node to a different computing node acting as a recovery node, and resuming execution of the process on the different computing node.

20 Claims, 12 Drawing Sheets

(56) References Cited

U.S. PATENT DOCUMENTS

| | | |
|---|---|---|
| 8,140,914 B2 | 3/2012 | Murphy et al. |
| 8,261,132 B2 | 9/2012 | Klein et al. |
| 8,793,283 B1 * | 7/2014 | Austern ............ G06F 17/30958 707/798 |
| 2002/0087913 A1 | 7/2002 | Harper et al. |
| 2006/0168473 A1 * | 7/2006 | Sahoo ................ G06F 11/1471 714/15 |
| 2007/0220298 A1 * | 9/2007 | Gross ................ G06F 11/3409 714/2 |
| 2010/0011254 A1 * | 1/2010 | Votta ..................... G06F 11/004 714/47.2 |
| 2010/0088494 A1 * | 4/2010 | Elnozahy .............. G06F 9/3863 712/228 |
| 2011/0296241 A1 | 12/2011 | Elnozahy |
| 2013/0124921 A1 | 5/2013 | Canini et al. |
| 2014/0129635 A1 * | 5/2014 | Hefty ..................... G06F 13/14 709/204 |
| 2015/0089285 A1 * | 3/2015 | Lim .................... G06F 11/1438 714/15 |
| 2015/0363277 A1 * | 12/2015 | Cher ................... G06F 11/1469 714/19 |

\* cited by examiner

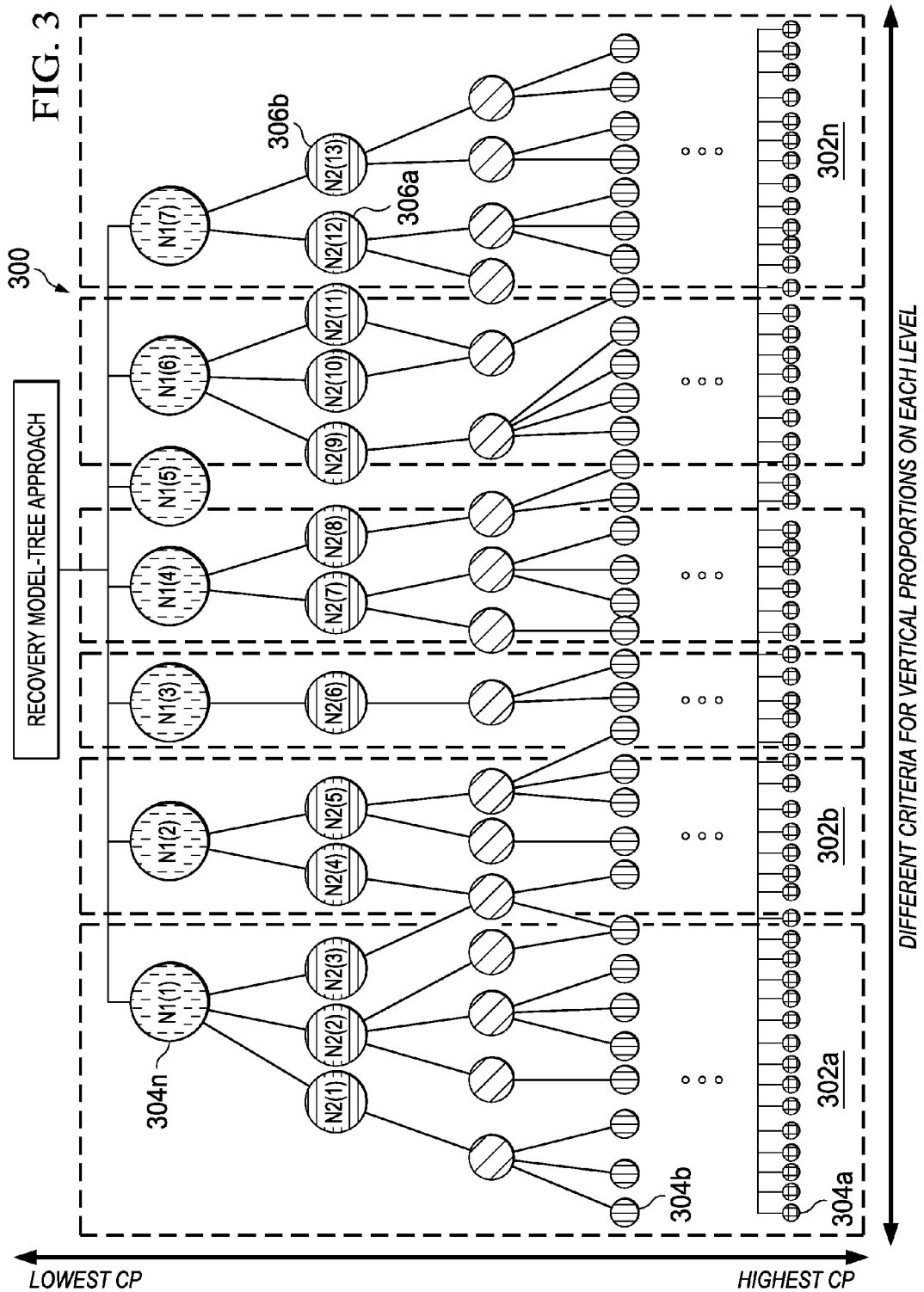

PROACTIVE FAILURE RECOVERY MODEL FOR DISTRIBUTED COMPUTING USING A CHECKPOINT FREQUENCY DETERMINED BY A MTBF THRESHOLD

BACKGROUND

Executing critical/real-time scientific applications, such as seismic data processing, three-dimensional reservoir uncertainty modeling, and simulations on distributed computing systems (e.g., homogeneous (clusters), heterogeneous (grid and cloud), etc.) with thousands of scientific applications processes requires high-end computing power that can require days or weeks of processing data to generate a desired solution. The success of long job execution depends on the reliability of the system. As most scientific applications deployed on supercomputers can fail if only one of its processes fail, fault tolerance in distributed systems is an important feature in complex computing environments. Tolerating any type of computer processing failure reactively typically involves a choice whether to allow periodic checkpointing of the status of one or more processes—an effective technique widely applicable in high-performance computing environments. However, this technique has overhead concerns associated with selecting optimal checkpoint intervals and stable storage locations for checkpoint data. Additionally, current failure recovery models are typically limited to a few types of computing failures and manually invoked in case of computing failure(s) which limits their usefulness and efficiency.

SUMMARY

The present disclosure describes methods and systems, including computer-implemented methods, computer-program products, and computer systems, for providing a proactive failure recovery model for distributed computing according to an implementation. One computer-implemented method includes building a virtual tree-like computing structure of a plurality of computing nodes, for each computing node of the virtual tree-like computing structure, performing, by a hardware processor, a node failure prediction model to calculate a mean time between failure (MTBF) associated with the computing node, determining whether to perform a checkpoint of the computing node based on a comparison between the calculated MTBF and a maximum and minimum threshold, migrating a process from the computing node to a different computing node acting as a recovery node, and resuming execution of the process on the different computing node.

Other implementations of this aspect include corresponding computer systems, apparatuses, and computer programs recorded on one or more computer-readable media/storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising: collecting at least a computing power and node location parameter value for each computing node, dividing the computing nodes into collections based on their node location parameter, and sorting the nodes within each collection based on the computing power parameter.

A second aspect, combinable with any of the previous aspects, further comprising: identifying the upper-limit and lower-limit to determine levels of the sorted computing nodes, sorting the computing nodes within each collection into horizontal levels based on the computing power parameter and the upper-limit and lower-limit, recording the horizontal level placement and a vertical placement into a node-record-information table associated with each computing node; and populating each node-record-information table with a designated recovery node.

A third aspect, combinable with any of the previous aspects, wherein the upper-limit and lower-limit are determined from a cross plot of the collected computing power and node location parameters for each computing node and the vertical placement is determined based at least on the node location parameter for each computing node.

A fourth aspect, combinable with any of the previous aspects, wherein the MTBF is calculated based at least upon a network or data storage failure.

A fifth aspect, combinable with any of the previous aspects, further comprising: creating a checkpoint when the MTBF of the computing node is less than the lower-limit and updating the lower-limit associated with the computing node to equal the MTBF.

A sixth aspect, combinable with any of the previous aspects, further comprising: determining that a failure of the computing node has occurred and using the last checkpoint taken for the computing node as a process state.

The subject matter described in this specification can be implemented in particular implementations so as to realize one or more of the following advantages. First, the described failure recovery model system and method has an inexpensive framework design that permits reliable, continued operation of computational processes even if a partial/severe computational node (e.g., a computer server, etc.) failure occurs—enhancing business continuity optimality. The failure recovery model system allows continued operation and achieves a high performance rating for optimally executing failed job executions. Because the failure recovery model is proactive (rather than reactive) costs are further reduced for re-processing jobs and allows for cost avoidance and both time and effort saving from failure recovery practices. Second, the framework is scalable for a huge number of computational nodes. Third, the framework design takes into account different disaster recovery principles factors. Fourth, the described system and method will greatly minimize overhead caused by unnecessary process checkpointing. Fifth, the described system and method can be configured to practice any type of load-balancing technique to optimize processing. Sixth, the system and method does not rely on localized or centralized checkpoint storage for operation. Seventh, the system and method relies on a failure prediction Qmodel to control an optimum placement of a checkpoint process. Eighth, the proposed system and method design permits a high degree of business continuity optimality. Other advantages will be apparent to those of ordinary skill in the art. Ninth, the failure predication model within this framework design can capture and address any type of failures (power supply, software, hardware, network, etc.).

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 3 illustrates an example virtual tree-like structure of nodes according to an implementation.

Like reference numbers and designations in the various drawings indicate like elements.

DETAILED DESCRIPTION

Figure 1A:
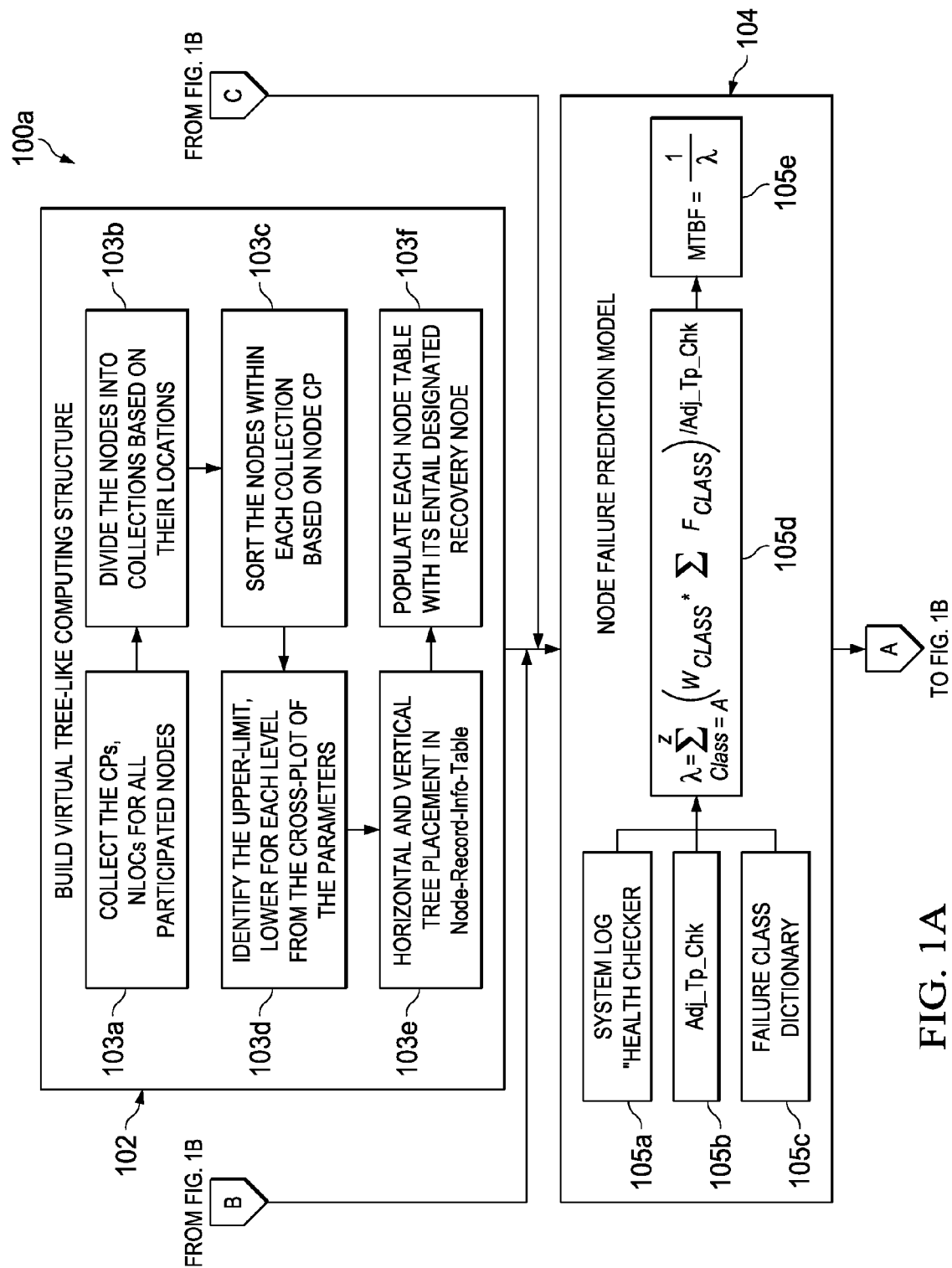
FIGS. 1A-1C illustrate a method for providing a proactive failure recovery model for distributed computing according to an implementation.

The following detailed description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally describes methods and systems, including computer-implemented methods, computer-program products, and computer systems, for providing a proactive failure recovery model (FRM) for distributed computing to ensure business continuity optimality in the case computing node (e.g., a computer server, etc.) failure. Although the following description is focused on a particular implementation, the specific implementation is not meant to limit the applicability of the described subject matter for other uses and in manners consistent with this disclosure.

Executing critical/real-time scientific applications, such as seismic data processing and three-dimensional reservoir uncertainty simulations and modeling, on distributed computing systems (e.g., homogeneous (clusters), heterogeneous (grid and cloud), etc.) with thousands of processes requires high-end computer power and the scientific applications can spend days or sometime weeks processing data to generate a desired solution. The success of long executions depends on the reliability of the system. As most scientific applications deployed on supercomputers can fail if only one of its processes fail, fault tolerance in distributed systems is an important feature in complex computing environments. Tolerating any type of computer processing failure reactively typically involves a choice whether to allow periodic checkpointing of the status of one or more processes.

Checkpointing is an effective technique widely applicable in high-performance computing environments and the most effective fault tolerant technique used in case of a failure during the execution of a process in distributed systems. In checkpointing, the state of a process executing on a node is saved periodically on reliable and stable storage, such as a hard disk, flash memory, etc. In some implementations, checkpointing creates a file describing a running process (e.g., the above-described "state of a process") with which an operating system can use to later reconstruct the process. For example, the checkpoint file can contain data about a stack, heap, and register(s) of the checkpointed process. The checkpoint file can also contain the status of pending signals, signal handlers, accounting records, terminal state, and any other necessary data needed to reconstruct a process at a given point-in-time. A process is therefore enabled to continue execution at and from the point where a particular checkpoint was taken rather from the beginning by freshly restarting the process anew.

At a high-level, the FRM is configured to maintain consistent subject application/process throughput, maintain a minimally necessary set of checkpoints to optimize/minimize process rework execution time, achieve an optimal load-balancing strategy among recovery survival nodes (described in more detail below), minimize diskless or input/output operations, store checkpoint data in a stable and secure storage, and/or minimize memory overhead. In some instances, the FRM can also reduce checkpointing latency (a time between when a process initiates a checkpoint request and a global checkpoint process completes it) through the use of non-blocking checkpointing that will not block processing jobs that are in an execution mode unless a processing job is hosted in a node participating in a recovery. As a result, processing job execution latency is reduced.

More particularly, the described FRM is, in some instances, implemented as: 1) a scalable, virtual, tree-like structure supporting a high-performance, stable computing system in cases of failure-free computing and high availability of recovery resources in cases of failure-occurrence; and 2) a failure prediction model (FPM) used in typical instances to minimize an overhead of coordination and context switching of checkpoint-based algorithms by measuring effectiveness of and a need for each checkpoint request.

Virtual Tree-Like Structure Computing Topology Design

A hierarchal tree-like computing topology design allows multiple options for allocation of both recovery-nodes and remote designated checkpoint data storage nodes that could reside in a different physical location). In a typical implementation, all computing nodes (nodes) participating in a distributed computing effort are virtually placed into a virtual tree-like structure as determined by two different parameters: 1) computing power (CP—placed on a Y-axis) and 2) node location (NLOC—placed on X-axis) to build the virtual tree-like structure. In other implementations, other parameters can be collected and/or used on either the Y- or X-axis to allow for tangible/meaningful classification and to build the described virtual tree-like structure.

Node Failure Prediction Model

Failure prediction has long been regarded as a challenging research problem, mainly due to the lack of realistic failure data from actual production systems. However, a calculated mean time between failure (MTBF), a statistical parameter used to represent the reliability of node, can be a good indicator for a failure rate within a predefined period of time in a near future for a node.

Failure in distributed computing environment can, in some implementations, be classified into five different categories which must be accounted for to ensure a robust and comprehensive failure recovery model. For example, categories can include: 1) crash failure—a server halts, but is working correctly until it halts; 2) omission failure (either receive or send omission)—a server fails to respond to incoming requests, a server fails to receive incoming messages, a server fails to send messages; 3) timing failure—a server's response lies outside the specified time interval; 4) response failure (value or state transition failure)—a server's response is incorrect; the value of the response is wrong, the server deviates from the correct flow of control; 5) an arbitrary failure—s server may produce arbitrary responses at arbitrary times.

In general, a distributed computing node structure (e.g., nodes N0; N1; N2; . . . ; Nn) are connected by a network connection locally or globally (e.g., Internet or other network cloud). Each node typically has its own physical memory and local disk (e.g., a stand-alone computing device) and a stable shared storage is deployed for large dataset sharing between nodes. In scientific, real-time, etc. applications, communication between nodes' processes can be accomplished through a message passing interface (MPI), shared memory designated for global send/receive requests between processes, and/or other communication method. Typically each process resides on a different node, but two or more separate processes can execute on a single node.

Assuming that communication channels between processes are stable and reliable and each node in the distributed computing system is volatile (meaning that a node may leave the distributed computing system due to failure, or join the distributed computing system after being repaired—also assuming a fail-stop model where a failed node will be isolated from the computing environment), the failure of a node will cause all processes on a failed node to stop working (all data of the affected processes on the failed node is lost). Here, FRM recovery/spare nodes can be used (rather than suspending the application till the failure is physically fixed) to continue the processing from the last checkpoint for each affected process.

A node failure situation for a particular node will typically be determined (e.g., predicted by the node's software agent—each node typically has its own service daemon "agent")/notified cooperatively (to designated participating nodes in the record table saved in each node that describes the structure of the computing environment) by any node residing at a same level as the particular node in the virtual tree-like structure. The predication of the particular node's failure is an important indicator allowing assessment of the risk of failure for some time in the near future and to take proactive steps to save a finer progression (higher granularity) of process states associated with the particular node. Therefore, if a serious failure occurs with the particular node when already predicted to likely fail, a large amount of re-processing time can be avoided due to the finer granularity in available node states that can be used to recover processes associated with the particular node. Typically, the predication of node-failure is balanced against the cost of taking/storage of checkpoints.

Figure 1B:
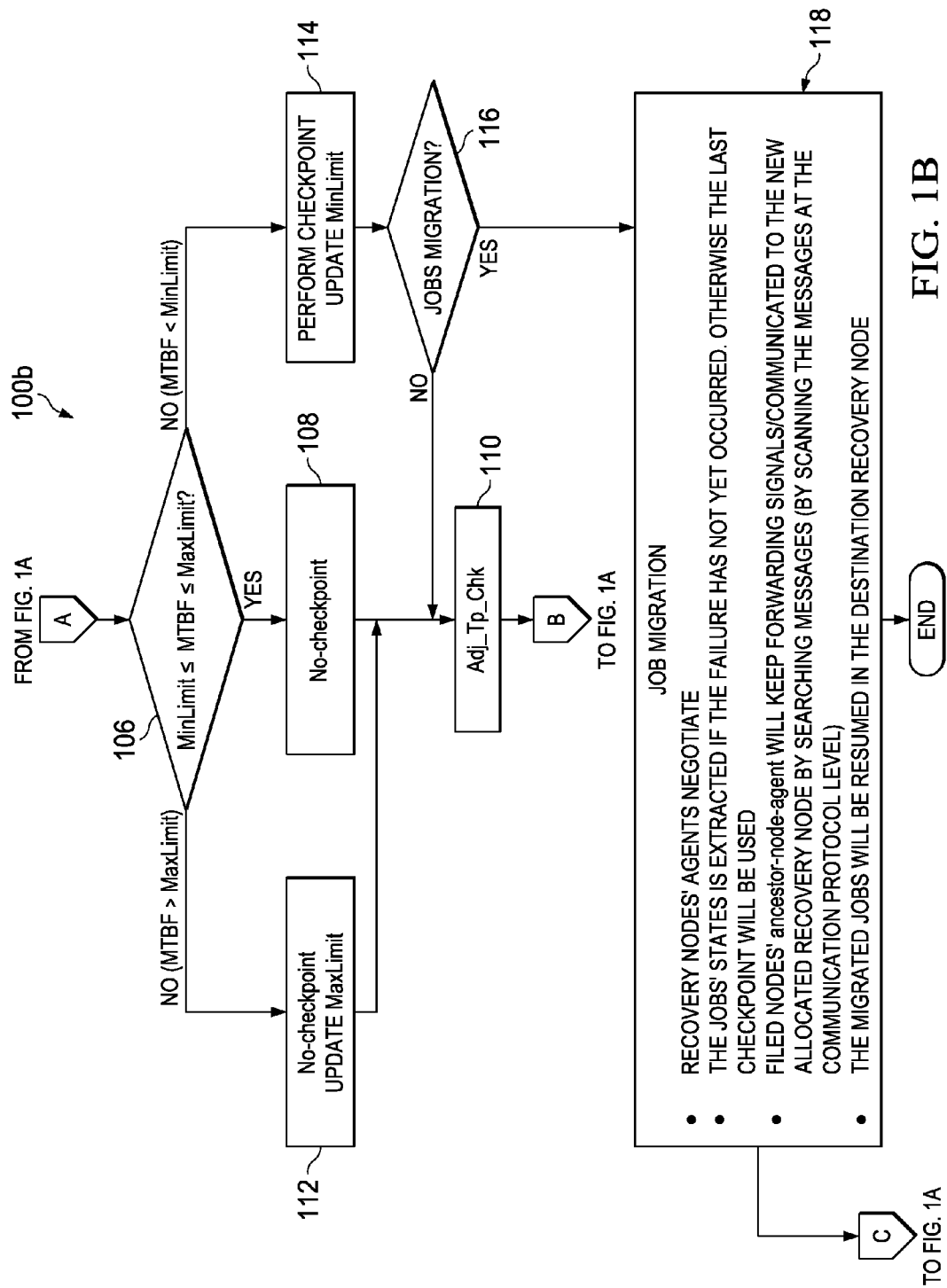
Figure 1C:
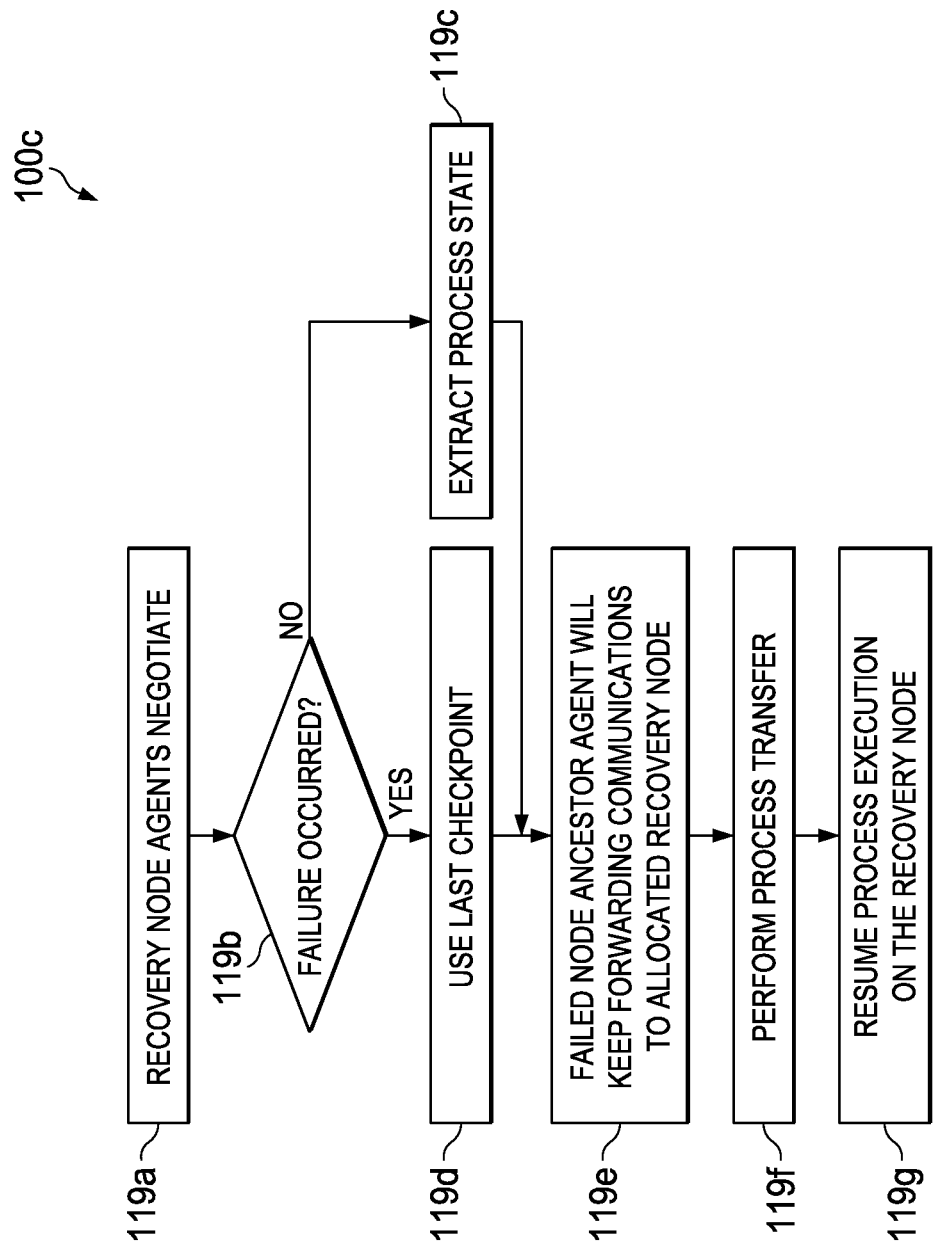

FIGS. 1A-1C illustrate a collective method 100 (divided into sub-methods 100a, 100b, and 100c) for providing a proactive failure recovery model for distributed computing according to an implementation. In other implementations, providing a proactive failure recovery model for distributed computing can include more or less steps/operations, including more of each described step/operation. Method 100 (or any of its individual sub-methods) may be performed by any suitable system, environment, software, and/or hardware, or a combination of systems, environments, software, and/or hardware as appropriate (e.g., the computer system described in FIG. 10 below). In some implementations, various steps of method 100 can be run in parallel, in combination, in loops, or in any order.

Building a Virtual Tree-Like Structured Model of Computing Nodes

Turning to FIG. 1A, at 102, a virtual tree-like structured model of nodes is built using available nodes in a distributed computing system. The tree-like structure is considered "virtual" as the tree of nodes is not actually arranged in the tree-like structure, but is mapped in this manner to communicate in a parent/child-type relationship. As will be appreciated by those of ordinary skill in the art, the use of computing power (CP) and node location (NLOC) parameters is only one possible implementation of building a virtual-tree like structured model of nodes and other parameters (e.g., computational hardware type and/or version, software version, etc.) consistent with this disclosure could be used in other implementations. The use of CP and NLOC parameters is not meant to limit the described subject matter in any way and other parameters are envisioned as within the scope of this disclosure. In typical implementations, CP is considered on the Y-axis and NLOC (or other parameter(s)) is(are) can be considered on the X-axis of the virtual tree-like structured model of nodes.

At 103a, at least computing power (CP), node location (NLOC), and/or other parameters are collected for all nodes of a distributed computing system participating in processing of, for example, a computational process. In some implementations, this collected data is placed into a data structure, file, etc. (e.g., a node-record-information table) for use by a virtual tree creation process (not illustrated). In some implementations, each node is aware of all other nodes and associated parameters. For example, each node can have access to the data structure/file containing collected parameter information for the nodes in the distributed computing system. This information can be used to allow each node to be aware of its siblings, descendants, etc. From 103a, method 100a proceeds to 103b.

At 103b, the nodes are divided into collections based upon their location (NLOC). From 103b, method 100a proceeds to 103c.

At 103c, the nodes are sorted within each collection based on the node CP parameter. From 103c, method 100a proceeds to 103d.

Figure 2:
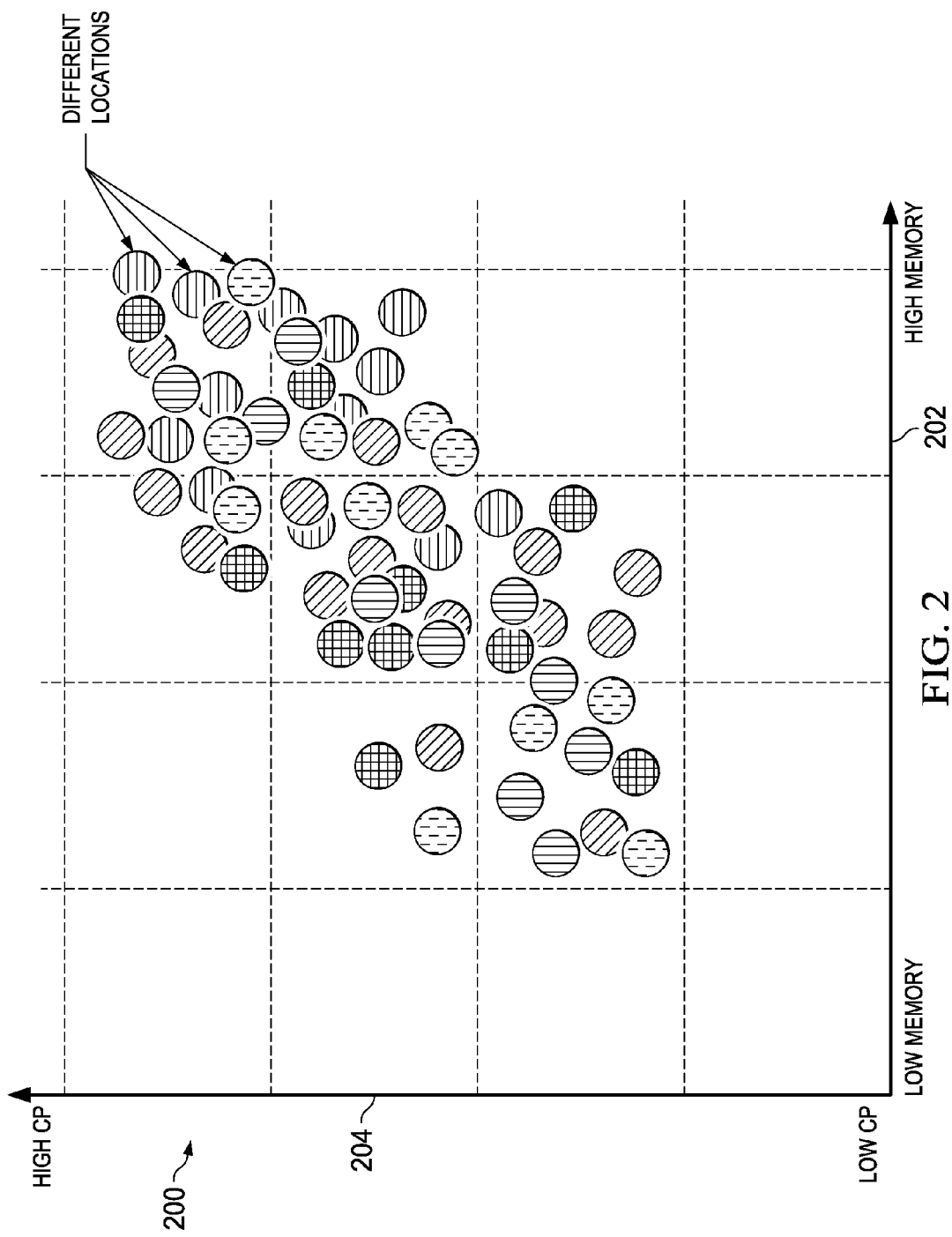
FIG. 2 illustrates an example cross-plot of collected parameters from nodes that can be used to build a node virtual tree-like structure according to an implementation.

At 103d, the lower limit and upper limit (i.e., thresholds) for each level is determined from a cross-plot of the collected parameters from the nodes. Turning now to FIG. 2, FIG. 2 illustrates an example cross-plot of collected parameters from nodes that can be used to build a node virtual tree-like structure according to an implementation. As illustrated, each node (note that hashing/patterns can represent colors to indicate different locations (NLOCs)—e.g., all "blue" plotted nodes are at a particular location while all "green" plotted nodes are at a different particular location) can be plotted according to, in some implementations, a memory parameter value (e.g., low-to-high—say a range of 8 GB-64 GB of computer server memory) on the X-axis 202 and CP parameter value (low-to-high—say a range of 1.6-3.5 GHz processor clock) on the Y-axis 204. As will be appreciated by those of ordinary skill, this is just one of many possible methods of generating a cross-plot. The use of any suitable parameters consistent with this disclosure is envisioned to be within the scope of this disclosure.

In some implementations, horizontal placement of a node (i.e., which horizontal "line" the node is part of) is CP-based depending on the node's location within the cross-plot of FIG. 2. For example, based on a node's CP parameter and location, a node could be in a bottom, middle, or top position in the virtual tree-like structure. In the illustrated example, the horizontal placement could, in some instances be generally that a most-bottom attached node would be a node with a highest CP parameter value (higher computational ability), while the higher in the tree-like structure a node is placed, the lower the CP parameter value is (lower computational ability).

In some implementations, the vertical placement of a node (e.g., left or right along the above-described horizontal "line"—such as that node 304b is placed in FIG. 3 below) depends upon different classifiable criteria, for example physical location, subnet, bandwidth speed, power supply line, etc. and balances the virtual tree-like structure by default. For example, if the x-axis criteria used in the cross-plot guides placement of a particular node in the tree structure, the virtual tree-like structure is balanced and can be used as an indicator as to whether a correct physical disaster-recovery setup is applied in a computational environment. Additional criteria used to separate nodes vertically can include, among other things physical location, subnet, bandwidth speed, power supply line, and/or other additional criteria. From 103d, method 100a proceeds to 103e.

At 103e, a horizontal and/or vertical tree placement entry for each node is made in a node-record-information table. From 103e, method 100a proceeds to 103f.

At 103f, the node-record-information table for each node is populated with an associated designated checkpoint and/or recovery node(s) for the node. Based on the horizontal/vertical position in the virtual tree-like structure, ancestor and descendent nodes can be determined for each node in the virtual tree-like structure and the node-record-information table updated with this information. In addition, for each particular node, another node (e.g., one or more direct children) can be designated as the default recovery node for the particular node and another node(s) can be designated as the particular node's checkpoint node. Typically, the checkpoint nodes are not a sibling, child, or ancestor node of the particular node in the virtual tree-like structure. In some implementations, the designated recovery node and checkpoint node for a particular node can be the same. From 103f, method 100a proceeds to 104 (a node failure prediction model).

Turning now to FIG. 3, FIG. 3 illustrates an example virtual tree-like structure 300 of nodes according to an implementation (e.g., as built according to 103a-103f above). As described in 103b above, 302a, 302b, . . . , 302n illustrate collections of nodes by location (NLOC), for example places in different network subnets. As described in 103c and 103d above, 304a, 304b, . . . , 304n are nodes sorted by the CP parameter and divided into horizontal levels by a cross-plot of collected parameters from the nodes. For example, node 304a could have a higher CP parameter value than node 304n. Further, nodes (e.g., 306a and 306b) are separated vertically within the same horizontal level based upon the above-described (or other) different classifiable criteria—for example physical location, subnet, bandwidth speed, etc. An example unique node identification (node ID) value is shown inside some nodes (e.g., 304n displays "N1(1)" for level 1, node 1 and node 306b displays "N2(13)" for level 2, node 13), and so on (although node IDs below N2 are not illustrated). Any suitable unique node identifier is envisioned to be within the scope of this disclosure.

Note that the topology of the virtual tree-like structure is adaptive. For example, if more or less nodes are added to a particular location, a node CP value changes, nodes are swapped for higher-CP/memory models, etc., the relationship tree within that NLOC-divided collection can be updated and relationships with other nodes in other NLOC-divided collections can also be updated. For example, if a new node is added to the distributed computing system, the virtual tree-like structure creation process can execute again. In some instances, the tree can be partially or wholly restructured.

Figure 4A:
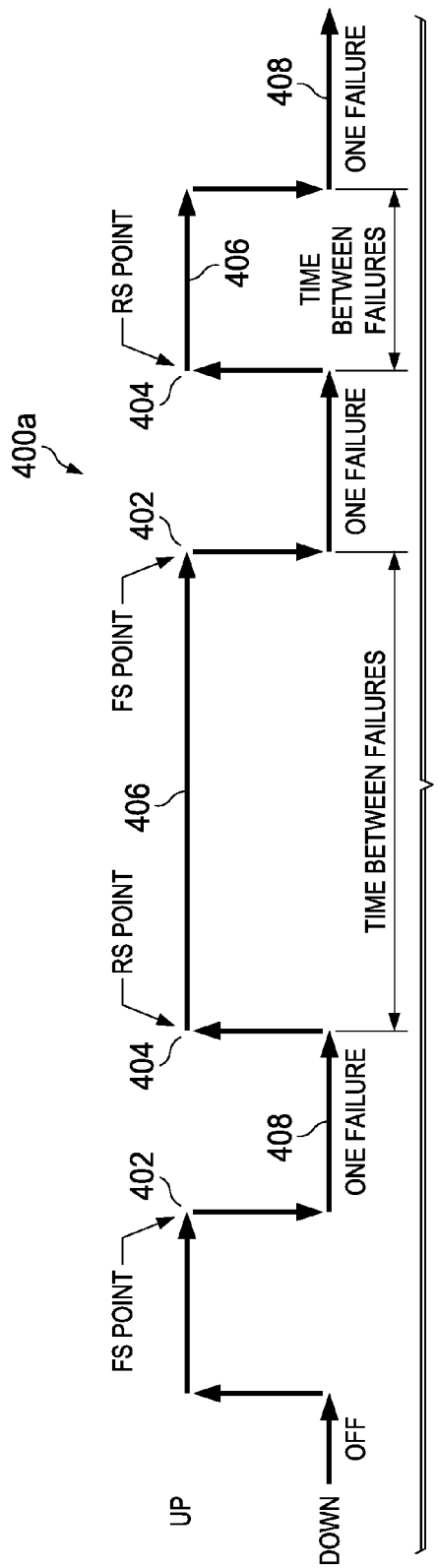
FIG. 4A illustrates node performance values used in a calculation of a MTBF according to an implementation.

Turning to FIG. 4A, FIG. 4A illustrates node performance values 400a used in a calculation of a MTBF according to an implementation. Here, 402 is a failure start point (the time at which a failure begins (or "down time")) and 404 is a recovery start point 404 (the time at which processing restarts (or "up time")). 406 is the time between failures (the difference between the "down time" and the "up time" is the amount of time operating between the two events). 408 represents a failure.

Figure 4B:
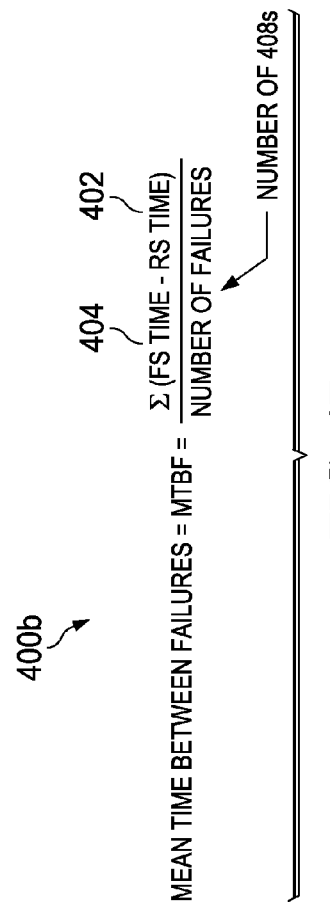
FIG. 4B illustrates the typical academic formula used for calculating a MTBF for a node according to an implementation.

Turning to FIG. 4B, FIG. 4B illustrates the typical academic formula 400b used for calculating a MTBF for a node according to an implementation. Here, the MTBF is a sum of operational periods (e.g., for a node) divided by a number of observed failures 408 (e.g., again for the node). As will be appreciated by those of ordinary skill, other variations of MTBF or similar values using more or less data values and consistent with this disclosure could also be used in a prediction of node failure and resultant actions as describe below. From 104, method 100a proceeds to method 100b (FIG. 1B).

At FIG. 1B, decisions 100b whether to checkpoint a process state and/or to migrate a process (job) are performed. The checkpoint time calculation is to minimize system overhead of taking a checkpoint of a node to times in which it is deemed more necessary (e.g., based on the MTBF for the node).

At 106, the MTBF for a node calculated in method 100a is compared to a minimum threshold (MinLimit) and a maximum threshold (MaxLimit). Initially, the MinLimit and MaxLimit are set to some predetermined time value. The MinLimit value can be changed as needed (e.g., to determine when to perform a next health check on a node). The MaxLimit can also be changed as necessary (e.g., to reflect an increasing MTBF value).

If at 106, MTBF is between MinLimit and MaxLimit (e.g., greater than or equal to MinLimit and less than or equal to MaxLimit), method 100b proceeds to 108. At 108, no checkpoint of the node is taken. From 108, method 100b proceeds to 110.

At 110, the time for taking the next checkpoint is adjusted based on a new MTBF calculation performed for the node by the software agent for the node (assesses the current state of the node in terms of failures—how many failures happened in the last time period). In this way, the checkpoint interval can dynamically adjust depending upon the state of the node. For example, after the first checkpoint, if five minutes is set for the next checkpoint, five minutes is waited. After the next checkpoint, a MTBF assessment is performed based on failures (if any) within the last five minutes. Based on the MTBF calculated, the checkpoint interval can be adjusted up or down (e.g., as in FIG. 5). From 110, method 100b proceeds to 104 described in relation to FIG. 1A.

If at 106, MTBF is greater than MaxLimit, method 100*b* proceeds to 112. At 112, no checkpoint of the node is taken and MaxLimit is updated to equal the MTBF. In some implementations, a MaxLimit above a particular threshold can initiate the generation of an alert that the MaxLimit is too high. From 112, method 100*b* proceeds to 110.

If at 106, MTBF is less than MinLimit, method 100*b* proceeds to 114. At 114, a checkpoint of the node is taken and MinLimit is updated to equal the currently calculated MTBF value. In some implementations, the checkpoint can include, among other things, the process state (register contents), memory contents, communication state (e.g., opened files and message channels), relevant kernel context, and/or queued jobs. From 114, method 100*b* proceeds to 116.

At 116, a decision is performed as to whether jobs (processes) should be migrated is based on a threshold for proactive failure recovery (e.g., MTBF<MinLimit value as determined at 106). The threshold value can be enforced subjectively depending upon failure frequencies in a particular node. If it is determined that jobs should not be migrated, method 100*b* proceeds to 110. If, it is determined that jobs should be migrated, method 100*b* proceeds to 118 to perform a job migration.

Figure 5:
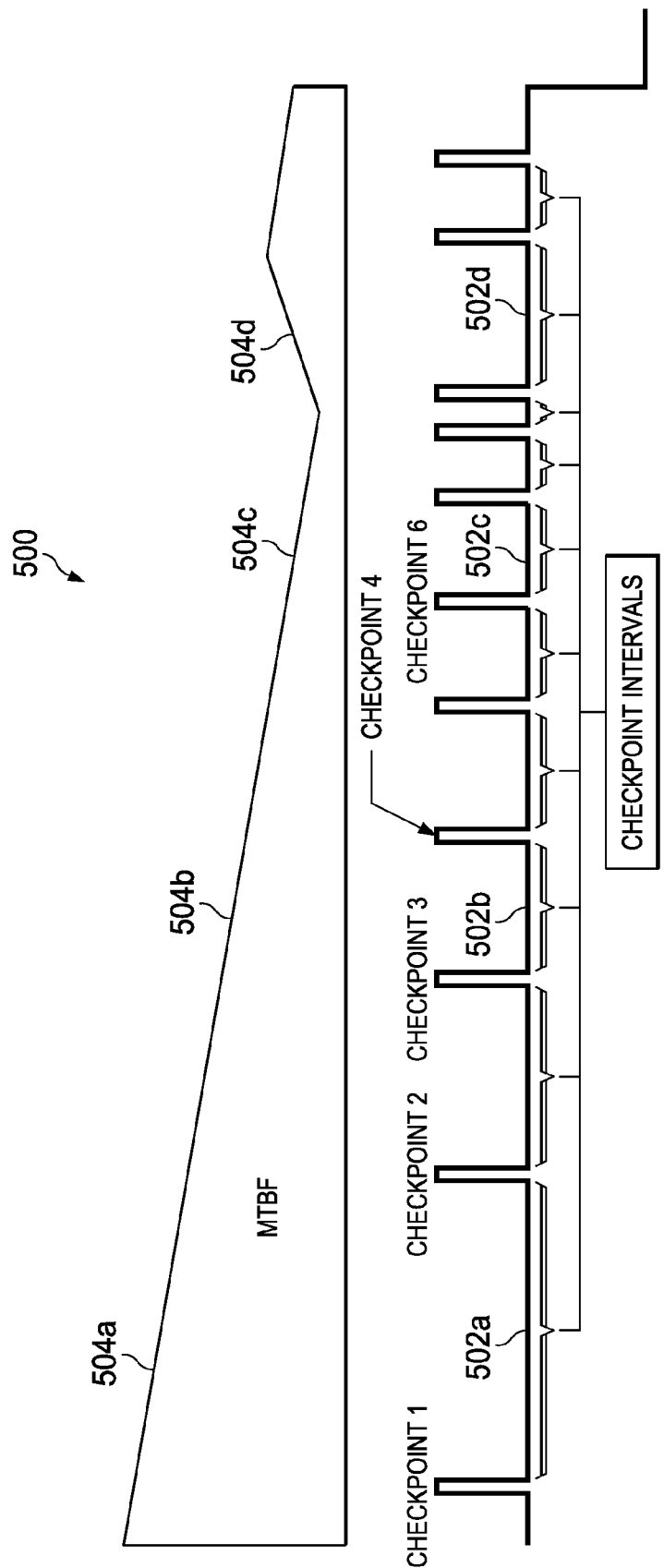
FIG. 5 is a graph illustrating checkpoint interval placement in relation to MTBF according to an implementation

Turning now to FIG. 5, FIG. 5 is a graph illustrating checkpoint interval placement in relation to MTBF according to an implementation. As illustrated, the time between checkpoints (checkpoint intervals) (e.g., 502*a*, 502*b*, and 502*c*) becomes shorter as the MTBF decreases (e.g., 504*a*, 504*b*, and 504*c* which correspond to the example checkpoint intervals, respectively). As the MTBF increases (e.g., at 504*d*), the checkpoint intervals decrease (e.g., at 502*d*). This is to ensure that as the risk of failure increases (due to the decreased MTBF), it is advantageous to create a checkpoint for the node at shorter intervals to minimize overhead and to maximize the optimality of business continuity if the node fails (can recover at a point closer to the actual failure time to minimize lost processing).

Turning now to FIG. 1C, FIG. 1C illustrates a method flow 100*c* for migrating jobs between nodes.

At 119*a*, recovery node software agents negotiate to determine which node should host a job to migrate. In some implementations, the negotiation is for load balancing purposes. In other implementations, other parameters/criteria can be used for negotiation purposes. From 119*a*, method 100*c* proceeds to 109*b*.

At 119*b*, a determination is performed as to whether a failure of the node has occurred. If it is determined that a failure of the node has not occurred, method 100*c* proceeds to 119*c*. If it is determined that a failure has occurred, method 100*c* proceeds to 119*d*.

At 119*c*, the process state of the node is extracted. In some implementations, the process state can include, among other things, the process state (register contents), memory contents, communication state (e.g., opened files and message channels), relevant kernel context, and/or queued jobs. From 119*c*, method 100*c* proceeds to 119*e*.

At 119*d*, the last checkpoint is used in place of the current node state (because the node has failed and is "down"/unavailable to retrieve a process state from). In some implementations, the checkpoint can include, among other things, the process state (register contents), memory contents, communication state (e.g., opened files and message channels), relevant kernel context, and/or queued jobs. From 119*d*, method 100*c* proceeds to 119*e*.

At 119*e*, the failed ancestor recovery node software agent will keep forwarding signals/communications to a new recovery node (e.g., by searching messages at a communication protocol level). Note that in some implementations, if a failed node is repaired, responsibility to forward signals/communication can be performed by the repaired node (at which point the repaired node will be handed over the process of forwarding signals/communication). From 119*e*, method 100*c* proceeds to 119*f*.

At 119*f*, a process transfer is performed from the "down" node to the recovery node. The transferred state typically includes a process's address space, execution point (register contents), communication state (e.g., open files and message channels), and/or other operating system dependent state. From 119*f*, method 100*c* proceeds to 119*g*.

At 119*g*, the process is resumed to execute on the recovery node. From 119*g*, method 100*c* stops. Returning to FIG. 1B, from 118, method 118 for the particular down node stops. In typical implementations, the failed node is isolated from the current computational run if a job migration has been performed for it and the failed node cannot be returned to the same job family and participate even if repaired (e.g., the node is removed from the node-record-information table for one or more nodes in the virtual tree-like structure and must wait until the start of a new computational run). Processing returns to FIG. 1A for a different node using the node failure prediction model. In other implementations, it can be possible to repair the failed node (e.g., the repaired node can be re-integrated into the virtual tree-like structure node-record-information tables, processed by the node failure prediction model, and begin processing, forwarding signals/communication, etc.).

Returning to FIG. 1A, at 104, in some implementations, a node failure prediction model is executed to, among other things, evaluate a current machine state for each node in order to determine whether to perform a checkpoint of the node, migrate a job (process) from one node to another node, etc. The calculation of a MTBF for each node is calculated by a software agent residing/executing on at least one node residing in the same level in the tree structure as a particular node to be evaluated for a failure condition and/or on the particular node itself. For example, in FIG. 3, any node in the level in which node 304*b* resides can determine and MTBF for node 304*b* and notify appropriate nodes of this determination.

As illustrated in 104, in some implementations, values that can be used in the failure prediction model include one or more system logs 105*a* (e.g., network connection failures/refusals, packet loss, computational speed degradation, low memory conditions, storage/network issues, etc.), generated, for example, by a "health check"-type/"heartbeat" program, an adjustment to the time period to check 105*b* (e.g., a dynamically calculated value that represent a period of time to wait to perform a next health check performed by a function executing on each node participating in computations. The function is invoked after dynamically calculating a time period to check 105*b* value to determine the next time period) and a failure class dictionary 105*c* gathered periodically (e.g., a tp period of time). In some implementations, the types of issues, failures, etc. can be weighted (e.g., network/storage are more important, etc.).

At 105*d*, a failure type frequency is calculated by classifying every failure with a weight value subjectively assigned to each class of failure to measure impact when calculating a failure frequency at every tp period of time. For example, electrical power supply and network connectivity can be monitored and their failure type frequencies can be calculated for a particular period of time tp. In other implementations, the failure type frequency can be calculated using any appropriate algorithm. At 105*c*, in some implementations, the MTBF can be calculated by dividing 1 by the calculated failure type frequency.

Figure 6:
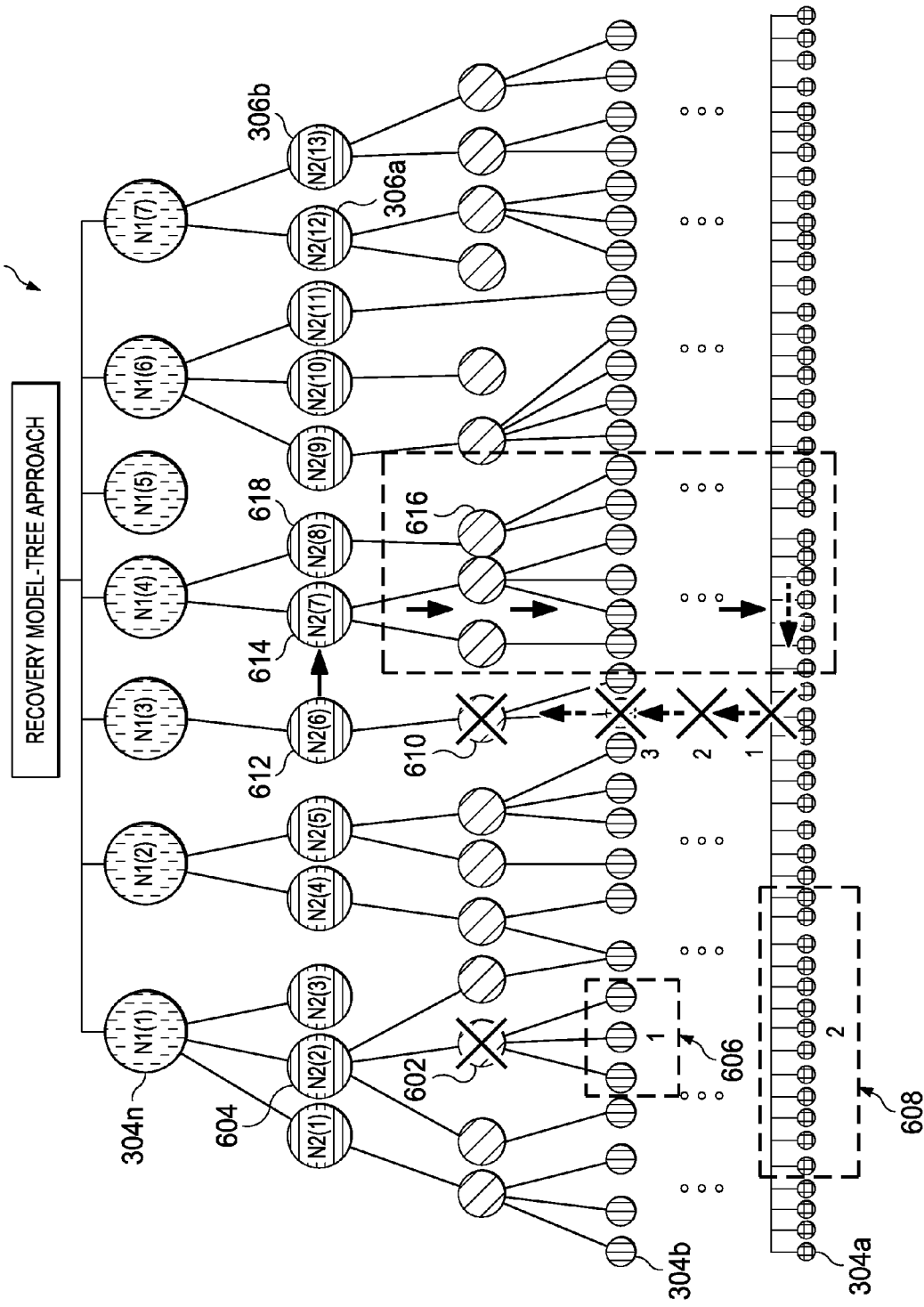
FIG. 6 illustrates an example virtual tree-like structure of nodes when a partial node failure occurs and how the recovery model is used for a recovery according to an implementation.

FIG. 6 illustrates an example virtual tree-like structure 600 of nodes when a partial node failure occurs and how the recovery model is used for a recovery according to an implementation. Achieving a recovery in the virtual tree-like structure is accomplished, first, by a notification from any node at a same level of a failed node's descendants to be recovered otherwise a notification will be sent to the failed node's ancestors.

In an example, if node 602 fails, node 602's direct children (descendants) 604 or further descendants 606, which have a higher computing power then that parent node, will detect that an issue has occurred (e.g., loss of connection with node 602, data receipt from node 602 stops, heartbeat detection for node 502 indicates node failure, etc.). The question is which other node(s) should replace node 602 to handle the jobs being performed by node 602 to optimize the business continuity. The options are either parent node 604 or descendant nodes 606 or 608. In this case, nodes 606 or 608 can be assigned the jobs for node 602 (due to their much higher computing power CP) in order to complete the jobs originally run on node 602 in a faster period of time to optimize business continuity. The decision to use the descendants of node 602 can also be dependent upon the loading of the child nodes as determined by a load balancing analysis of the descendant nodes.

The recovery for any failed node by allocating any alive, available and lightly loaded (determined by load-balancing in the system) nodes from the node's siblings-decedents (if no one of the failed node's direct descendants is alive) is referred to as generation-stop. For example, if node 610 fails, node 610's children should detect the failure of node 610. In this example, however, all the children of node 610 are also down. The question then becomes which node(s) should replace node 510 to complete node 510's jobs. Here, the ancestor node 612 is notified (e.g., by a communication protocol between two jobs residing on two different nodes—such as message passing interface (MPI) and/or other protocol) of the failure of node 610 and will seek a relative at its same level to take over processing of at least failed node 610's jobs (and in some instances the jobs of node 610's descendants as well). Here, node 612 communicates with node 614 (note that node 614 can be in a different subnet—refer to FIG. 3) to see if it and its children can assume the processing of failed node 610's jobs. In this example, assuming that node 614 accepted this failure recovery task, it can delegate the jobs to its direct children which can delegate the jobs to their children, etc. as appropriate (e.g., based on computing power, subject, load-balancing, etc.) to optimize business continuity. Note also that in this example, one or both direct child nodes of node 614 can also communicate with a child node of a different parent node (e.g., node 616) to also enlist its assistance in working on jobs originally linked to failed node 610 or node 614 and its sibling to its right 618 (or other nodes at the level of 612). Typically in this case the recovery should be performed starting from the most bottom-up nodes (with higher CP values) where the most descendent nodes of other siblings' descendant nodes will participate in the recovery of the leaf nodes only then the leaf nodes will participate to recovery of their ancestor tree.

Figure 7:
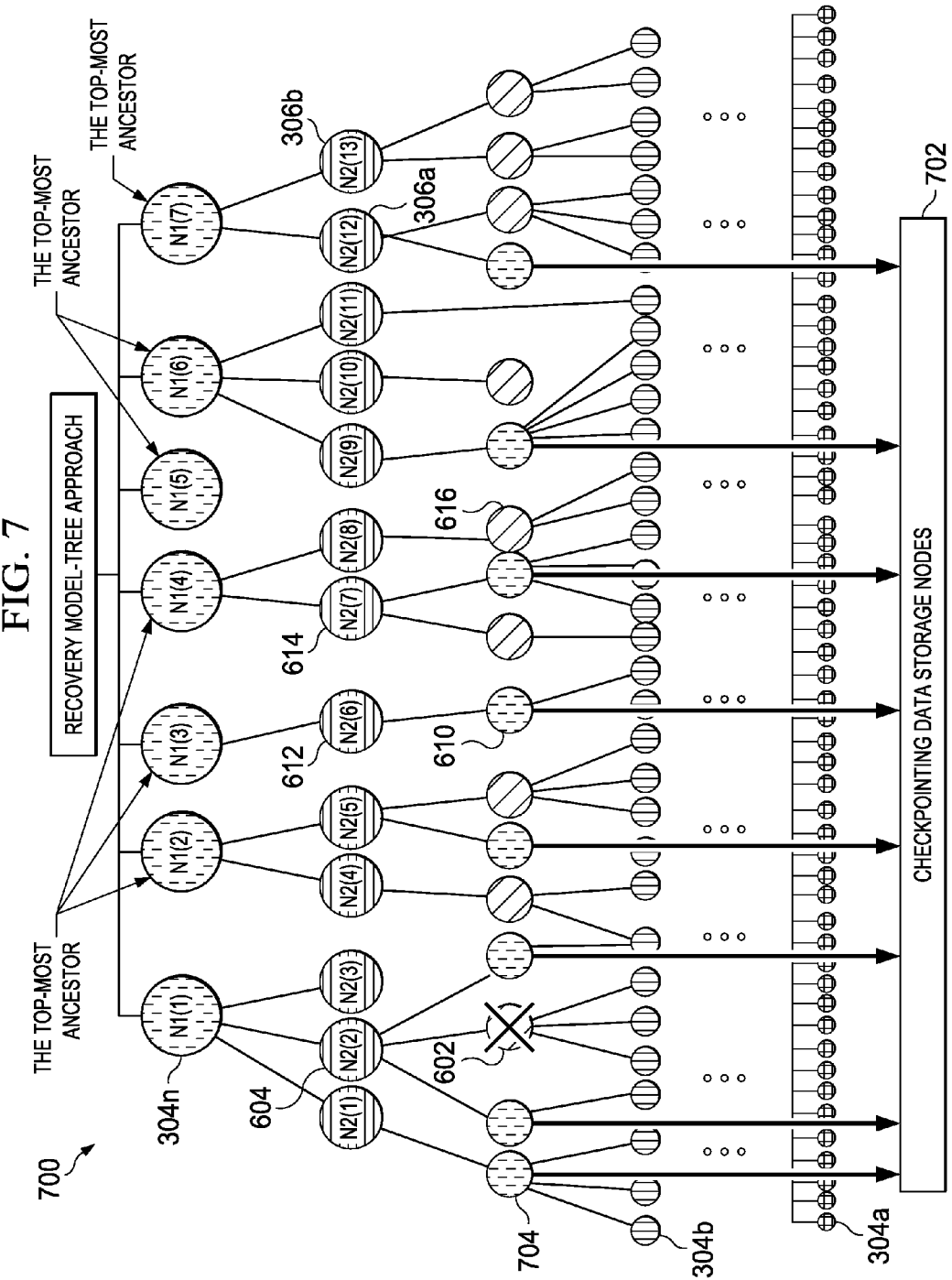
FIG. 7 illustrates checkpointing data storage nodes for the nodes of the virtual tree like structure when a node experiences a semi-failure according to an implementation.

Turning now to FIG. 7, FIG. 7 illustrates checkpointing data storage nodes for the nodes of the virtual tree like structure when a node is experiencing a semi-failure according to an implementation. For example, node 610 has a designated one or more checkpointing data storage nodes 702 for storing checkpoint data. Likewise, node 704 also has one or more checkpointing data storage nodes 702 designated as a checkpointing data storage node for node 610. In some implementations, multiple nodes can share the same checkpointing data storage node(s). In other implementations, a checkpointing data storage node 702 is only used by one node or a few nodes (e.g., in the same subnet, siblings, etc.) to expand the number of checkpointing data storage nodes so that a failure of one or more checkpointing data storage nodes does not cause the loss of much checkpointing data. If a node fails, the node that is tasked with recovery for that node can access the node-record-information table to determine the default designated recovery node and checkpointing data storage node for the failed node.

In typical implementations, each process maintains only one permanent checkpoint. This reduces overall storage overhead and eliminates the need for garbage collection activities to clean up unused/abandoned checkpoints. In some implementations, checkpoint data for each node is saved in nodes that are in the same level (e.g., in siblings) of a node because the probability of failure of those nodes at the same time is low. In typical implementations, checkpoint data storage nodes are implemented in this manner to minimize risks of capturing safe states for a local job. The checkpoint data storage nodes have information for the currently related jobs either in the execution mode including work set data residing in memory for those jobs or queued in a queue.

Figure 8:
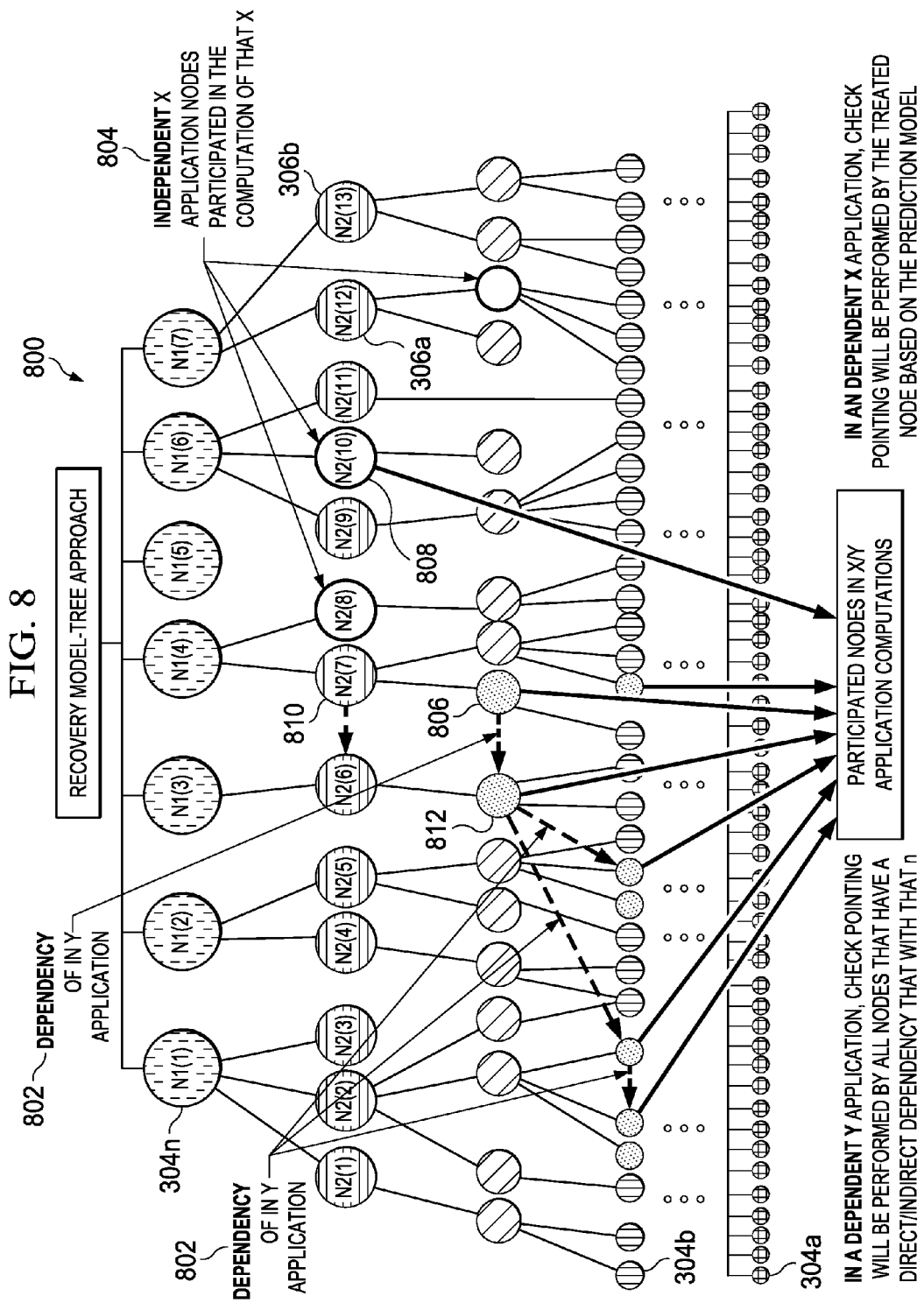
FIG. 8 illustrates nodes participating in application computations according to an implementation.

Turning now to FIG. 8, FIG. 8 illustrates nodes participating in application computations according to an implementation. As previously described, a checkpoint request will be initiated by a node's software agent where a degree of the predication model or desired reliability requires a checkpoint. If a node has an independent process (e.g., thread, etc.), X, it just performs check pointing action with its own corresponding checkpoint storage nodes in the tree without propagating the request to other nodes (as there are no other nodes participating in independent process X).

However, if a process is a dependent process (e.g., dependent on other processes), a minimal checkpoint approach will be applied where the checkpoint initiator node identifies all the processes with which it has communicated since last checkpoint/normal communication and propagates a request to all of them. Upon receiving the request, each process in turn identifies all the processes it has communicated with and propagates a request to them and so on until no more processes can be identified.

Referring to FIG. 8, both dependent process nodes 802 and independent process nodes 804 are identified. For example, for the example dependent process nodes, node 806 is the top-level node for a particular process. The nodes executing processes dependent on node 806's process are indicated by corresponding arrows. For a dependent process node (e.g., 806), a failure is communicated (e.g., by parent node 810) to all participating process nodes (e.g., 812, etc.) because they are working together and it is necessary for the other nodes to save the state of their processes until the other dependent process node (e.g., 806) is recovered and then the dependent processes can continue where they left off. Node 808, however, is executing an independent process and has no dependencies so a recovery need only concern itself with the independent node.

Figure 9:
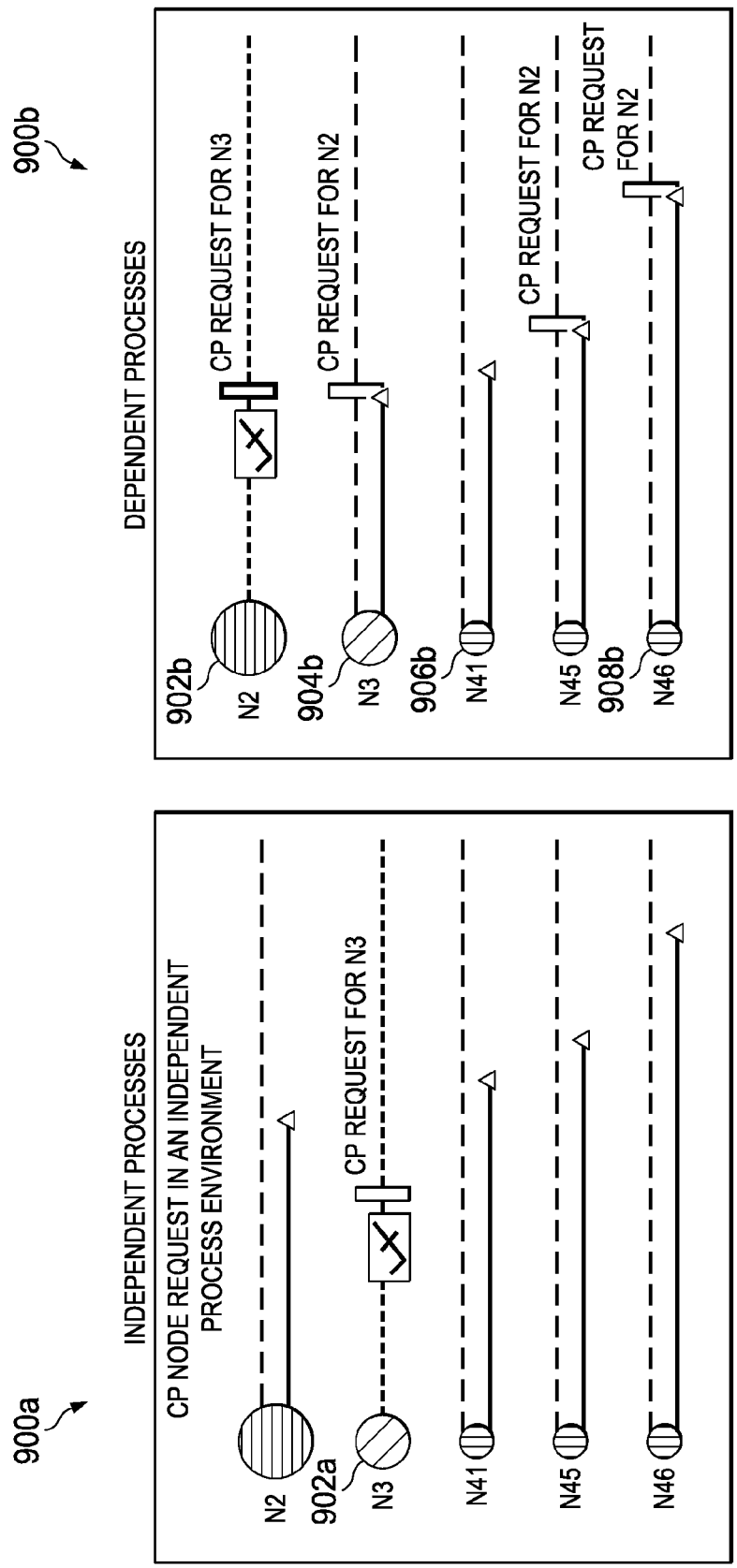
FIGS. 9A and 9B illustrate a checkpointing node request with respect to independent and dependent processes according to an implementation

Referring to FIGS. 9A and 9B, FIGS. 9A and 9B illustrate a checkpointing node request with respect to independent and dependent processes 900*a* and 900*b*, respectively, according to an implementation. FIG. 9A illustrates independent processes. For example, if independent process N3 902 receives a checkpoint request, the checkpoint of N3 is performed without regard to other processes. In the case of a dependent process N2 902b as in FIG. 9B, once a checkpoint request is received, the process N2 902b passes a checkpoint request to processes directly dependent upon it, for example, dependent process N3 904b. Dependent process 904B then passes a checkpoint request to processes directly dependent upon it (e.g., dependent processes N41 906b and N46 908b), and so on. Note that a checkpoint may occur slightly later for lower level dependent processes (e.g., dependent processes N41 906b and N46 908b) than the checkpoint for the "parent" dependent processes above (e.g., dependent process N3 904b) due to time for informing/requesting checkpoints from dependent processes. In some implementations, each dependent process can notify the requesting dependent process of when its checkpointing operation is complete.

Figure 10:
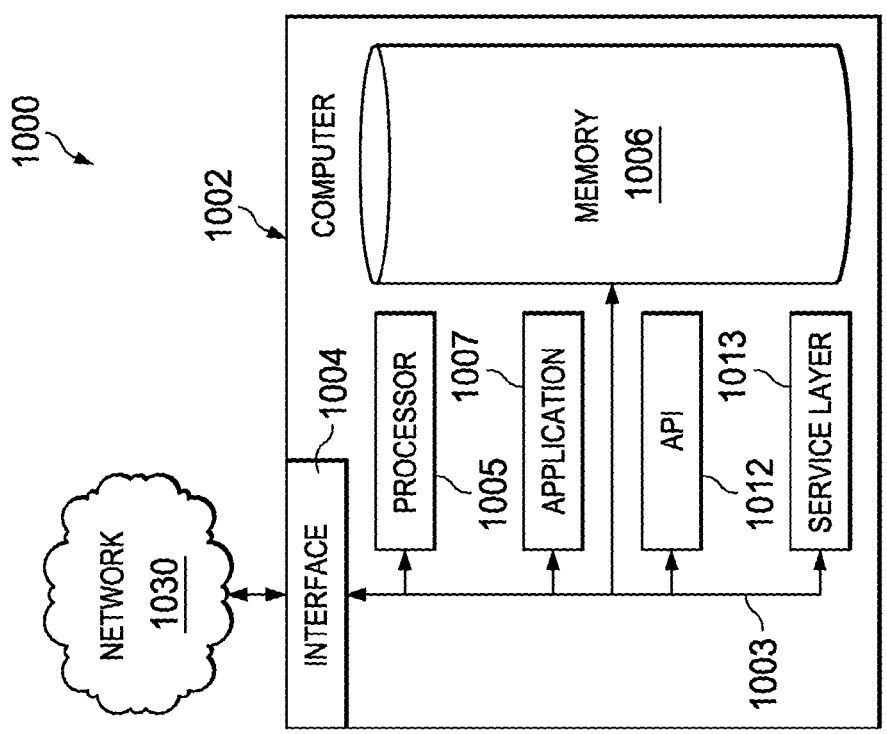
FIG. 10 is a block diagram illustrating an example computing device used for providing a proactive failure recovery model for distributed computing according to an implementation.

Turning to FIG. 10, FIG. 10 is a block diagram illustrating an example computing device 1000 used for providing a proactive failure recovery model for distributed computing according to an implementation. In some implementations, the EDCS 1000 includes a computer 1002 and a network 1030. In other implementations multiple computers and/or networks can work together to perform the above-described method(s).

The illustrated computer 1002 is intended to encompass a computing device such as a computer server, but can also include a desktop computer, laptop/notebook computer, wireless data port, smart phone, personal data assistant (PDA), tablet computing device, one or more processors within these devices, or any other suitable processing device, including both physical and/or virtual instances of the computing device. The computer 1002 may comprise a computer that includes an input device, such as a keypad, keyboard, touch screen, or other device (not illustrated) that can accept user information, and an output device (not illustrated) that conveys information associated with the operation of the computer 1002, including digital data, visual and/or audio information, or a user interface.

In some implementations, the computer 1002 can serve as a client and/or a server. In typical implementations, the computer 1002 acts as either a parallel processing node and also hosts, among other things, a software agent or other application, process, method, etc. consistent with this disclosure (even if not illustrated) (e.g., application 1007). The illustrated computer 1002 is communicably coupled with a network 1030. In some implementations, one or more components of the computer 1002 may be configured to operate within a parallel-processing and/or cloud-computing-based environment. Implementations of the computer 1002 can also communicate using message passing interface (MPI) or other interface over network 1030.

At a high level, the computer 1002 is an electronic computing device operable to receive, transmit, process, store, or manage data and information associated with providing a proactive failure recovery model for distributed computing according to an implementation. According to some implementations, the computer 1002 may also include or be communicably coupled with a simulation server, application server, e-mail server, web server, caching server, streaming data server, analytics server, and/or any other server.

The computer 1002 can receive requests over network 1030 from an application 1007 (e.g., executing on another computer 1002) and respond to the received requests by processing the said requests in an appropriate software application 1007. In addition, requests may also be sent to the computer 1002 from internal users (e.g., from a command console or by other appropriate access method), external or third-parties, other automated applications, as well as any other appropriate entities, individuals, systems, or computers.

Each of the components of the computer 1002 can communicate using a system bus 1003. In some implementations, any and/or all the components of the computer 1002, both hardware and/or software, may interface with each other and/or the interface 1004 over the system bus 1003 using an application programming interface (API) 1012 and/or a service layer 1013. The API 1012 may include specifications for routines, data structures, and object classes. The API 1012 may be either computer-language independent or dependent and refer to a complete interface, a single function, or even a set of APIs. The service layer 1013 provides software services to the computer 1002 and/or system of which the computer 1002 is a part. The functionality of the computer 1002 may be accessible for all service consumers using this service layer. Software services, such as those provided by the service layer 1013, provide reusable, defined business functionalities through a defined interface. For example, the interface may be software written in JAVA, C++, or other suitable language providing data in extensible markup language (XML) format or other suitable format. While illustrated as an integrated component of the computer 1002, alternative implementations may illustrate the API 1012 and/or the service layer 1013 as stand-alone components in relation to other components of the computer 1002. Moreover, any or all parts of the API 1012 and/or the service layer 1013 may be implemented as child or sub-modules of another software module, enterprise application, or hardware module without departing from the scope of this disclosure.

The computer 1002 includes an interface 1004. Although illustrated as a single interface 1004 in FIG. 10, two or more interfaces 1004 may be used according to particular needs, desires, or particular implementations of the computer 1002. The interface 1004 is used by the computer 1002 for communicating with other systems in a distributed environment—including a parallel processing environment—connected to the network 1030 (whether illustrated or not). Generally, the interface 1004 comprises logic encoded in software and/or hardware in a suitable combination and operable to communicate with the network 1030. More specifically, the interface 1004 may comprise software supporting one or more communication protocols associated with communications over network 1030.

The computer 1002 includes a processor 1005. Although illustrated as a single processor 1005 in FIG. 10, two or more processors may be used according to particular needs, desires, or particular implementations of the computer 1002. Generally, the processor 1005 executes instructions and manipulates data to perform the operations of the computer 1002. Specifically, the processor 1005 executes the functionality required for providing a proactive failure recovery model for distributed computing.

The computer 1002 also includes a memory 1006 that holds data for the computer 1002 and/or other components of a system of which the computer is a part. Although illustrated as a single memory 1006 in FIG. 10, two or more memories may be used according to particular needs, desires, or particular implementations of the computer 1002. While memory 1006 is illustrated as an integral component of the computer 1002, in alternative implementations, memory 1006 can be external to the computer 1002. In some implementations, memory 1006 can hold and/or reference one or more of, any data described with respect to method 100 (e.g., checkpoint data coverage scores, sameness scores, depth ratios, etc.) and/or any other appropriate data consistent with this disclosure.

The application 1007 is an algorithmic software engine providing functionality according to particular needs, desires, or particular implementations of the computer 1002 and/or a system of which the computer 1002 is a part, particularly with respect to functionality required to, for some implementations, for providing a proactive failure recovery model for distributed computing. For example, application 1007 can serve as (or a portion of) a software host, scientific processing application, checkpointing application, recovery application, and/or any other type of application consistent with this disclosure (whether illustrated or not). Although illustrated as a single application 1007, the application 1007 may be implemented as multiple applications 1007 on the computer 1002. In addition, although illustrated as integral to the computer 1002, in alternative implementations, the application 1007 can be external to and execute apart from the computer 1002.

There may be any number of computers 1002 associated with a distributed computer system performing functions consistent with this disclosure. Further, the term "client," "user," and other appropriate terminology may be used interchangeably as appropriate without departing from the scope of this disclosure. Moreover, this disclosure contemplates that many users/processes may use one computer 1002, or that one user/process may use multiple computers 1002.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a co-processor (e.g., a graphics/visual processing unit (GPU/VPU)), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of UI elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   building a virtual tree-like computing structure of a plurality of computing nodes;
   for each computing node of the virtual tree-like computing structure, performing, by a hardware processor, a node failure prediction model to calculate a mean time between failure (MTBF) associated with the computing node;
   determining whether to perform a checkpoint of the computing node based on a comparison between the calculated MTBF and a maximum and minimum threshold;
   migrating a process from the computing node to a different computing node acting as a recovery node; and
   resuming execution of the process on the different computing node.

2. The method of claim 1, further comprising:
   collecting at least a computing power and node location parameter for each computing node;
   dividing the computing nodes into collections based on their node location parameter; and
   sorting the computing nodes within each collection based on the computing power parameter.

3. The method of claim 2, further comprising:
   identifying an upper-limit and lower-limit threshold used to determine levels of the sorted computing nodes;
   sorting the computing nodes within each collection into horizontal levels based on the computing power parameter and the identified upper-limit and lower-limit thresholds;
   recording the horizontal level placement and a vertical placement into a node-record-information table associated with each computing node; and
   populating each node-record-information table with a designated recovery node.

4. The method of claim 3, wherein the upper-limit and lower-limit thresholds are determined from a cross plot of the collected computing power and node location parameters for each computing node and the vertical placement is determined based at least on the node location parameter for each computing node.

5. The method of claim 1, wherein the MTBF is calculated based at least upon a network or data storage failure.

6. The method of claim 1, further comprising:
   creating a checkpoint when the MTBF of the computing node is less than the minimum threshold; and
   updating the minimum threshold associated with the computing node to equal the MTBF.

7. The method of claim 6, further comprising:
   determining that a failure of the computing node has occurred; and
   using the last checkpoint taken for the computing node as a process state.

8. A non-transitory, computer-readable medium storing computer-readable instructions, the instructions executable by a computer and configured to:
   build a virtual tree-like computing structure of a plurality of computing nodes;
   for each computing node of the virtual tree-like computing structure, perform a node failure prediction model to calculate a mean time between failure (MTBF) associated with the computing node;
   determine whether to perform a checkpoint of the computing node based on a comparison between the calculated MTBF and a maximum and minimum threshold;
   migrate a process from the computing node to a different computing node acting as a recovery node; and
   resume execution of the process on the different computing node.

9. The medium of claim 8, further including instructions to:
   collect at least a computing power and node location parameter for each computing node;
   divide the computing nodes into collections based on their node location parameter; and
   sort the computing nodes within each collection based on the computing power parameter.

10. The medium of claim 9, further including instructions to:
    identify an upper-limit and lower-limit threshold used to determine levels of the sorted computing nodes;
    sort the computing nodes within each collection into horizontal levels based on the computing power parameter and the identified upper-limit and lower-limit thresholds;
    record the horizontal level placement and a vertical placement into a node-record-information table associated with each computing node; and
    populate each node-record-information table with a designated recovery node.

11. The medium of claim 10, wherein the upper-limit and lower-limit thresholds are determined from a cross plot of the collected computing power and node location parameters for each computing node and the vertical placement is determined based at least on the node location parameter for each computing node.

12. The medium of claim 8, wherein the MTBF is calculated based at least upon a network or data storage failure.

13. The medium of claim 8, further including instructions to:
    create a checkpoint when the MTBF of the computing node is less than the minimum threshold; and
    update the minimum threshold associated with the computing node to equal the MTBF.

14. The medium of claim 13, further including instructions to:
    determine that a failure of the computing node has occurred; and
    use the last checkpoint taken for the computing node as a process state.

15. A computer system, comprising:
    at least one hardware processor interoperably coupled with a memory storage and configured to:
      build a virtual tree-like computing structure of a plurality of computing nodes;
      for each computing node of the virtual tree-like computing structure, perform a node failure prediction model to calculate a mean time between failure (MTBF) associated with the computing node;
      determine whether to perform a checkpoint of the computing node based on a comparison between the calculated MTBF and a maximum and minimum threshold;
      migrate a process from the computing node to a different computing node acting as a recovery node; and
      resume execution of the process on the different computing node.

16. The system of claim 15, further configured to:
    collect at least a computing power and node location parameter for each computing node;
    divide the computing nodes into collections based on their node location parameter; and
    sort the computing nodes within each collection based on the computing power parameter.

17. The system of claim 16, further configured to:
identify an upper-limit and lower-limit threshold used to determine levels of the sorted computing nodes;
sort the computing nodes within each collection into horizontal levels based on the computing power parameter and the identified upper-limit and lower-limit thresholds;
record the horizontal level placement and a vertical placement into a node-record-information table associated with each computing node; and
populate each node-record-information table with a designated recovery node.

18. The system of claim 17, wherein the upper-limit and lower-limit thresholds are determined from a cross plot of the collected computing power and node location parameters for each computing node and the vertical placement is determined based at least on the node location parameter for each computing node.

19. The system of claim 15, wherein the MTBF is calculated based at least upon a network or data storage failure.

20. The system of claim 15, further configured to:
create a checkpoint when the MTBF of the computing node is less than the minimum threshold; and
update the minimum threshold associated with the computing node to equal the MTBF;
determine that a failure of the computing node has occurred; and
use the last checkpoint taken for the computing node as a process state.

\* \* \* \* \*